United States Patent
Salter et al.

(10) Patent No.: US 10,429,025 B2
(45) Date of Patent: Oct. 1, 2019

(54) VEHICLE LIGHT ASSEMBLY SENSING MOISTURE WITH LIGHT REFLECTION

(71) Applicant: Ford Global Technologies, LLC, Dearborn, MI (US)

(72) Inventors: Stuart C. Salter, White Lake, MI (US); Paul Kenneth Dellock, Northville, MI (US); Aaron Bradley Johnson, Allen Park, MI (US); Stephen Kenneth Helwig, Farmington Hills, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/586,667

(22) Filed: May 4, 2017

(65) Prior Publication Data
US 2018/0320884 A1    Nov. 8, 2018

(51) Int. Cl.
| | | |
|---|---|---|
| *F21S 45/33* | (2018.01) | |
| *F21S 45/37* | (2018.01) | |
| *B60Q 1/00* | (2006.01) | |
| *F21S 45/60* | (2018.01) | |
| *F21S 41/20* | (2018.01) | |
| *F21V 29/90* | (2015.01) | |

(52) U.S. Cl.
CPC ............ *F21S 45/33* (2018.01); *B60Q 1/0023* (2013.01); *F21S 41/28* (2018.01); *F21S 45/37* (2018.01); *F21S 45/60* (2018.01); *F21V 29/90* (2015.01)

(58) Field of Classification Search
CPC ....... B60Q 1/0017; B60Q 1/04; B60S 1/0818; B60S 1/0822; B60S 1/0833; B60S 1/477; B60S 1/485; B60S 41/00; B60S 1/087; B60S 1/0877; F21S 48/34; F21S 48/335; F21S 48/337; F21S 48/33; F21S 45/60; F21S 45/33; F21S 45/37; F21V 29/90; F21W 2102/00; F21Y 2015/10; F21Y 2015/30; F21Y 2103/10
See application file for complete search history.

(56) References Cited

U.S. PATENT DOCUMENTS 5,391,891 A * 2/1995 Wiegleb ............... B60S 1/0822
                                              250/227.25
6,995,354 B2 * 2/2006 Hagen .................. B60S 1/0822
                                              219/522
(Continued)

FOREIGN PATENT DOCUMENTS

| CN | 201298942 Y | 8/2009 |
| DE | 202012005908 U1 | 8/2012 |

(Continued)

OTHER PUBLICATIONS

Machine English Translation of Korean Patent Application Pub. No. KR 201220050268.*

*Primary Examiner* — Zheng Song
(74) *Attorney, Agent, or Firm* — Vichit Chea; Price Heneveld LLP

(57) ABSTRACT

A vehicle light assembly including a housing, a light source, a lens disposed in front of the light source, a light sensor disposed in the housing outside of light output from the light source directed at the lens for sensing light reflected off the lens caused by moisture, and a heater disposed on the lens for reducing the moisture when moisture is sensed.

17 Claims, 4 Drawing Sheets

(56) References Cited

U.S. PATENT DOCUMENTS

| | | | |
|---|---|---|---|
| 7,629,558 B2 | 12/2009 | Petrenko | |
| 7,705,338 B2 * | 4/2010 | Ishikawa | B60S 1/0822 |
| | | | 250/573 |
| 7,914,162 B1 * | 3/2011 | Huang | B60L 1/14 |
| | | | 362/92 |
| 8,271,198 B2 * | 9/2012 | Teder | G01W 1/14 |
| | | | 702/3 |
| 9,109,785 B2 * | 8/2015 | Suzuki | H01M 10/6561 |
| 9,371,032 B2 | 6/2016 | Veerasamy | |
| 2005/0275521 A1 * | 12/2005 | Li | B60Q 1/0023 |
| | | | 340/468 |
| 2011/0134655 A1 * | 6/2011 | Ohtani | H05B 3/84 |
| | | | 362/546 |
| 2013/0249375 A1 * | 9/2013 | Panagotacos | H05B 33/0803 |
| | | | 313/13 |
| 2014/0184075 A1 * | 7/2014 | Ter-Hovhannissian | |
| | | | F21V 3/06 |
| | | | 315/114 |
| 2014/0218039 A1 * | 8/2014 | Shen | H05B 33/0884 |
| | | | 324/414 |
| 2015/0330594 A1 * | 11/2015 | Ah | H02K 35/02 |
| | | | 362/547 |
| 2017/0067609 A1 * | 3/2017 | Ichikawa | F21S 48/234 |

FOREIGN PATENT DOCUMENTS

| | | | | |
|---|---|---|---|---|
| DE | 102012012014 A1 | | 1/2013 | |
| FR | 2897321 A1 | | 2/2006 | |
| JP | 61178245 A | * | 8/1986 | |
| KR | 20110037032 A | * | 4/2011 | |
| KR | 20120050268 A | | 5/2012 | |
| KR | 20120124873 A | * | 11/2012 | F21S 48/34 |

\* cited by examiner

VEHICLE LIGHT ASSEMBLY SENSING MOISTURE WITH LIGHT REFLECTION

FIELD OF THE INVENTION

The present invention generally relates to vehicle lighting, and more particularly relates to vehicle lighting assemblies that sense and reduce moisture.

BACKGROUND OF THE INVENTION

Automotive vehicles are commonly equipped with various exterior lighting assemblies including vehicle headlights at the front of the vehicle and taillights at the rear of the vehicle. Vehicle exterior lighting assemblies typically include a light source disposed within a housing having an outer lens. Some assemblies experience moisture buildup on the inside of the lens. In addition, moisture in the form of snow and ice may accumulate on the outside of the lens in cold weather conditions. It is generally known to provide defogger elements on the lens to evaporate the moisture that may be present on the lens. It may be desirable to provide for an enhanced lighting assembly that senses moisture and reduces the moistures buildup on the lens.

SUMMARY OF THE INVENTION

According to one aspect of the present invention, a vehicle light assembly is provided. The vehicle light assembly includes a housing, a light source, and a lens disposed in front of the light source. The vehicle light assembly also includes a sensor disposed in the housing for sensing light reflected from moisture on the lens, and a heater disposed on the lens and activated based on the sensed light for reducing the moisture.

Embodiments of the first aspect of the invention can include any one or a combination of the following features:
 the light assembly includes a controller for controlling the heater to heat the lens when moisture is detected with the sensor;
 the heater comprises an electric heater having a conductive circuit formed on the lens;
 the conductive circuit comprises a visually transparent conductive material;
 the sensor comprises a light sensor;
 the light source directs light output within a beam towards the lens and the sensor is disposed within the housing outside of the beam;
 the light assembly includes a light shield located between the light source and the sensor;
 the light assembly comprises a vehicle headlight on the front of the vehicle; and
 the light assembly comprises a vehicle taillight on the rear of the vehicle.

According to another aspect of the present invention, a vehicle light assembly is provided. The vehicle light assembly includes a housing, a light source, and a lens disposed in front of the light source. The vehicle light assembly also includes a light sensor disposed in the housing outside of a beam of light output directed from the light source towards the lens for sensing light reflected from moisture on the lens, and a heater disposed on the lens for reducing the moisture.

Embodiments of the second aspect of the invention can include any one or a combination of the following features:
 the light assembly includes a controller for controlling the heater to heat the lens when moisture is detected with the sensor;
 the heater comprises an electric heater having a conductive circuit formed on the lens;
 the conductive circuit comprises a visually transparent conductive material;
 the light assembly includes a light shield located between the light source and the sensor;
 the light assembly comprises a vehicle headlight on the front of the vehicle; and
 the light assembly comprises a vehicle taillight on the rear of the vehicle.

According to another aspect of the present invention, a vehicle headlight assembly is provided. The vehicle headlight assembly includes a housing, a light source, and a lens disposed in front of the light source, wherein the light source directs light output in a beam towards the lens. The vehicle headlight assembly also includes a light sensor disposed in the housing outside of the beam of light output from the light source directed at the lens for sensing light reflected from moisture on the lens, and a heater disposed on the lens for reducing the moisture.

Embodiments of the third aspect of the invention can include any one or a combination of the following features:
 the light assembly includes a controller for controlling the heater to heat the lens when moisture is detected with the sensor;
 the heater comprises an electric heater having a conductive circuit formed on the lens; and
 the light assembly includes a light shield located between the light source and the sensor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
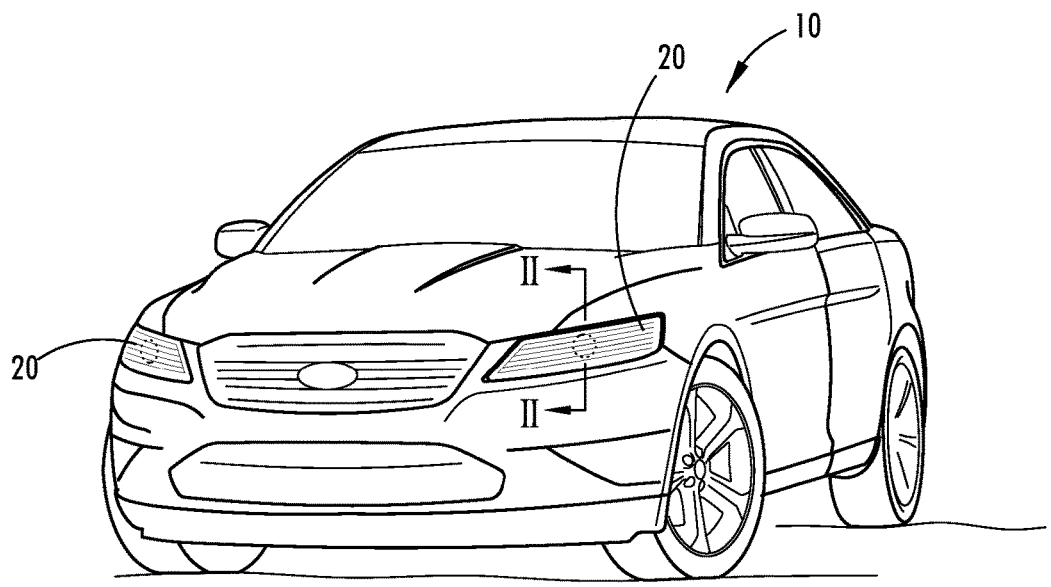
FIG. 1 is a front perspective view of a vehicle equipped with a vehicle headlight assembly having moisture sensing and removal, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

Figure 1A:
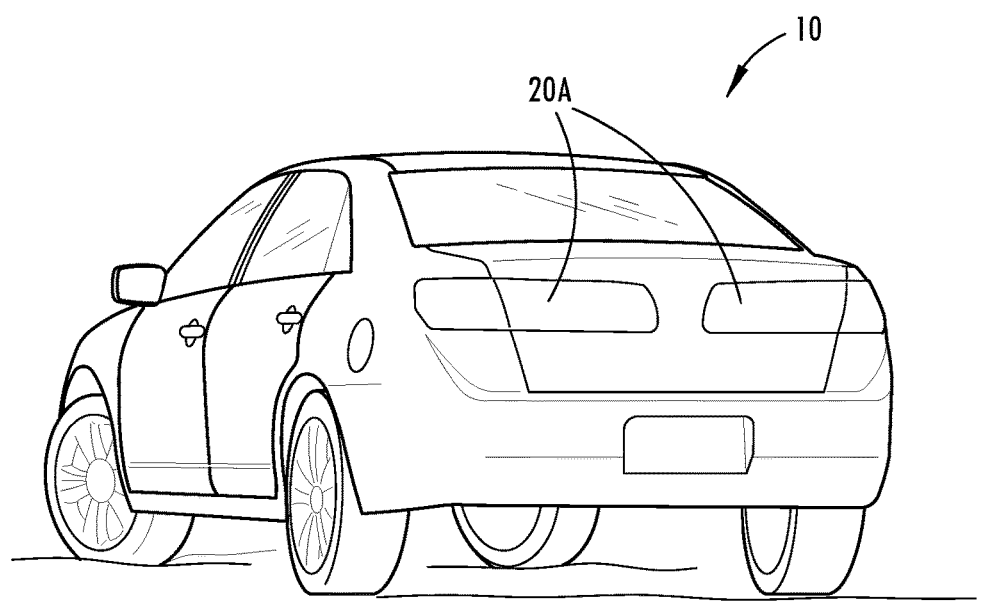
FIG. 1A is a rear perspective view of the vehicle having taillights that may include the moisture sensing and removal.

Referring to FIGS. 1-1A, a wheeled motor vehicle 10 is generally illustrated having moisture sensing and heater or defogging circuitry provided in the vehicle exterior light assemblies. The vehicle 10 is shown having a pair of vehicle headlight assemblies 20 located at the front left and right corners of the vehicle 10 for providing headlight illumination forward of the vehicle 10. The vehicle 10 is also shown having a pair of vehicle taillight assemblies 20A located at the rear left and right corners of the vehicle 10 for providing taillight illumination generally rearward of the vehicle. Each of the headlamp assemblies 20 and taillight assemblies 20A may be configured to include a light detector that provides moisture sensing and a heater arrangement for removal of the moisture from the respective lighting assemblies. It should be appreciated that while each of the headlight assemblies 20 shown and described herein in detail has the light detector and heater arrangements, the taillight assemblies 20A may likewise be configured to include the light sensor and heater arrangements for sensing and removing moisture.

Figure 2:
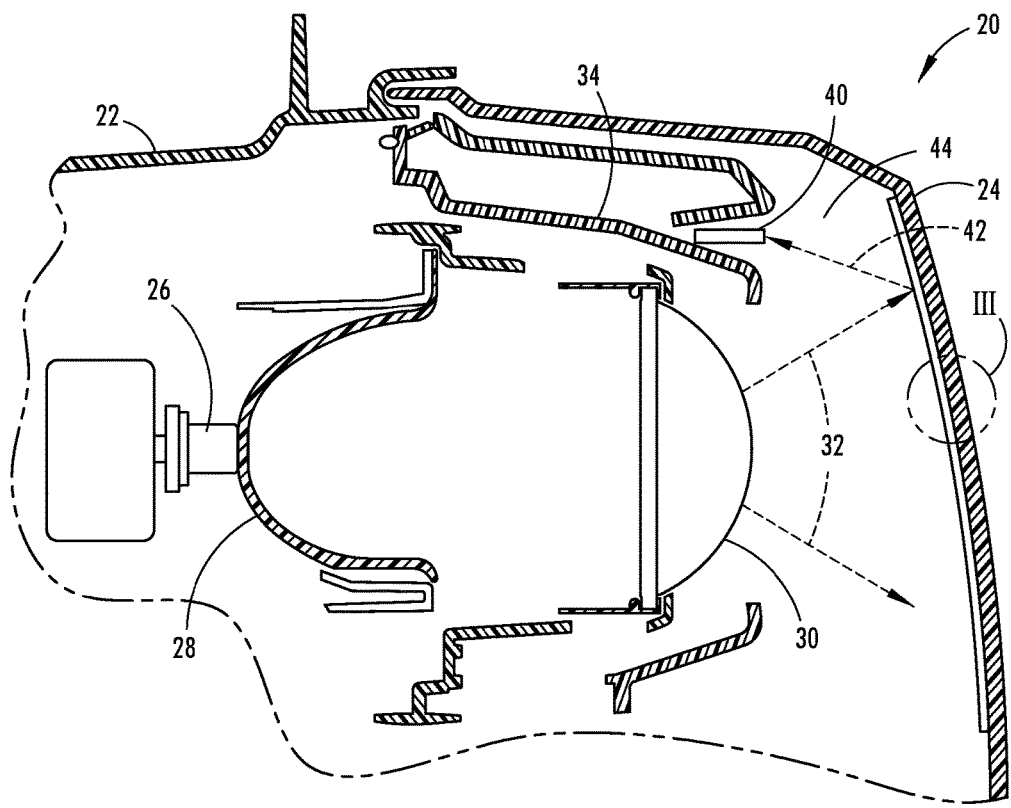
FIG. 2 is a cross-sectional view of the headlight taken through line II-II of FIG. 1.

Referring to FIG. 2, the vehicle headlight assembly 20 is shown having a housing 22 and an outer lens 24 which is connected to and may form a part of the housing 22. The housing 22 is generally fixed to the vehicle body and lens 24 may be connected to housing 22 in a conventional manner. Disposed within the housing 22 and outer lens 24 is a light source 26, a reflector 28, and an inner lens 30. The light source 26 may include one or more light emitting diodes (LEDs), incandescent bulbs, halogen bulbs, or other sources of light illumination. The reflector 28 is generally positioned to reflect light output from the light source 26 forward of the vehicle through the inner lens 30 and outer lens 24 to illuminate the roadway generally forward of the vehicle 10. The light is output from the inner lens 30 within a beam 32 towards the outer lens 24 and is transmit through the outer lens 24, provided the light is not blocked by moisture or other light restricting mediums. The inner lens 30 and outer lens 24 may be made of a clear light transmissive polymeric material. The light assembly 20 may be configured as a low beam light assembly, a high beam light assembly, or a combination of low and high light beam assemblies. Additionally, the housing 22 and outer lens 24 may include a plurality of light sources for multiple functions, such as headlight illumination, daylight running lamps, turn signals, flashers, and other lighting functions.

The vehicle light assembly 20 includes a sensor, in the form of a light sensor 40 disposed in the housing 22 for sensing light reflected rearward from the outer lens 24 caused by moisture on the outer lens 24. The light sensor 40 may be a light-dependent resistor (LDR) or other photo sensor. The light sensor 40 is located in a region 44 of the housing 22 outside of the light beam 32 output from the light source 26 and inner lens 32 and directed at the outer lens 24. As such, light generated by the light source 26 passes through the inner lens 30 and within beam 32 to the outer lens 24 where it is transmitted therethrough and exterior to the vehicle 10. In order to help ensure that light generated by the light source 26 is not directly to the light sensor 40, the light sensor 40 is located in region 44 with a shield 34 disposed between both the light source 26 and the inner lens 30 and the light sensor 40.

The light sensor 40 senses reflected light 42 that is reflected off the outer lens 24 and redirected rearward within the housing 22 due to moisture build up on the outer lens 24. Moisture may be in the form of humidity which is water vapor in the air, or may be in the form of condensation which is water on a surface of the lens 24, such as the inner and/or outer surfaces, which can be in the form of liquid water or frozen water (e.g., ice or frost). The build up of condensation or ice or snow on the inner or outer surfaces of the outer lens 24 blocks light that would otherwise penetrate through the outer lens 24 and causes at least some of the light to be reflected rearward of the outer lens 24 as seen by reflected light 42. The rearward reflected light 42 due to moisture on the outer lens 24 is detected by the light sensor 40 and processed to determine whether a sufficient amount of moisture has built up on the outer lens 24 such that a heating operation may be activated to remove the moisture.

Figure 3:
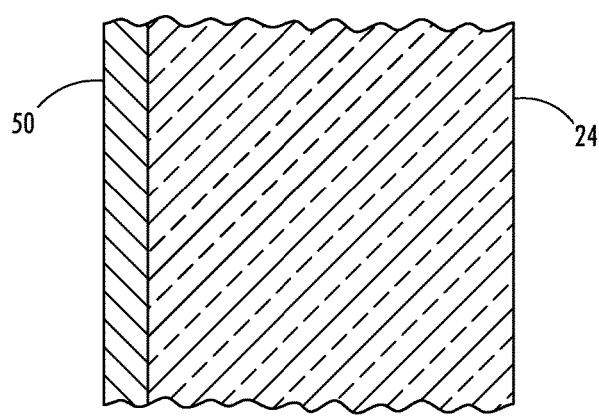
FIG. 3 is an enlarged cross-sectional view of section V-V of FIG. 2.
Figure 4:
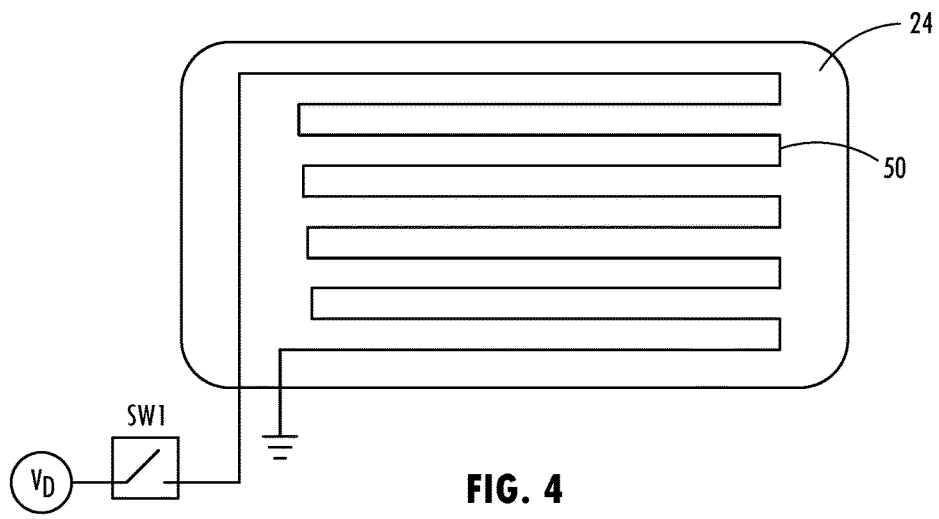
FIG. 4 is a schematic diagram of conductive heater/defroster circuitry formed on the lens, according to one embodiment.

In order to heat the outer lens 24, a heater 50 is shown disposed on the outer lens 24 as seen in FIGS. 3 and 4. The heater 50 may be formed of a conductive circuit that forms a resistive electrical heater that generates heat when electrical current passes therethrough. The circuitry forming heater 50 may be configured in various shapes and sizes. As seen in FIG. 4, a defogger voltage $V_D$ is applied to a switch SW1 at one end of the heater 50, while the opposite end of the heater 50 is shown grounded. Accordingly, when switch SW1 is in the closed position, the defroster voltage $V_D$ is applied to the heater 50 to generate an electrical current that passes through the heater 50 and, due to the electrical resistance, generates thermal energy or heat to defog or defrost the outer lens 24. This will cause the condensation on the inside or outside and snow or ice on the outside of the outer lens 24 to melt and thereby dissipate or be removed when moisture is sensed on the lens 24.

The heater 50 may be printed or otherwise adhered via an adhesive onto the inner surface of the outer lens 24, according to various embodiments. According to other embodiments, the heater 50 may be formed on the outer surface of the lens or an intermediate layer between the inner and outer surfaces of the outer lens 24. The conductive material forming the heater 50 may be formed of an optically or visually transparent conductive material, such as indium tin oxide (ITO), according to one embodiment.

The heater 50 may be formed with a film of indium tin oxide (ITO). The ITO forming the heater 50 may be formed as an ink printed onto the interior surface of the outer lens 24, according to one embodiment. The ITO may be deposited as a thin film onto the surface of the outer lens 24 and may have a thickness of about 1,000-3,000 angstroms to form a transparent electrical conductor. The ITO layer forming the heater 50 is a substantially visually transparent medium that can be used to form a heater element and other conductive signal lines for forming the heater 50. As such, the heater 50 will remain substantially invisible to a user looking through the outer lens 24. In other embodiments, other transparent and semi-transparent or visible conductive inks or films may be used to form the heater 50.

The vehicle light assembly 20 advantageously senses moisture build up on the outer lens 24 by sensing the reflection of light from moisture on the outer lens 24 as captured or sensed by the light sensor 40 within housing 22, and controls the heater 50 based on the sensed moisture which is based on the sensed light. Moisture in a liquid form or solid ice form has reflective properties that causes light from beam 32 to be reflected as reflected light 42. The light sensor 40 detects the reflected light 42. When a sufficient amount of moisture is sensed within the light assembly 20, the heater 50 is activated to heat the outer lens 24 to thereby dissipate and remove the moisture. It should be appreciated that the housing 22 or lens 24 may have a moisture outlet, such as a GoreTex® patch to allow heated moisture to exit the interior of the housing 22.

Figure 5:
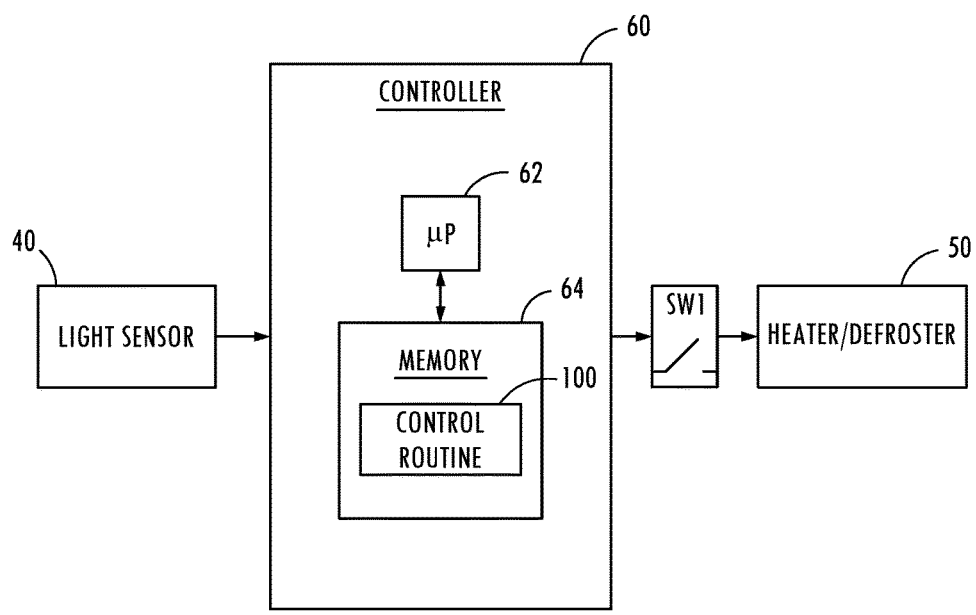
FIG. 5 is a block diagram illustrating controls for controlling the heater/defroster based on the sensed light.

Referring to FIG. 5, the heater 50 is illustrated controlled by a controller 60, according to one embodiment. The signal generated by the light sensor 40 is input to the controller 60, such as a microcontroller. The controller 60 may include circuitry, such as a microprocessor 62 and memory 64. It should be appreciated that other analog and/or digital control circuitry may be employed to process the light sensor signal and to control the heater/defroster 50 via switch SW1 to initiate the defogging and moisture removal process with the activation of the heater 50. The microprocessor 62 may execute the control routine 100 stored within memory 64 to control the heater/defroster 50 operation.

Figure 6:
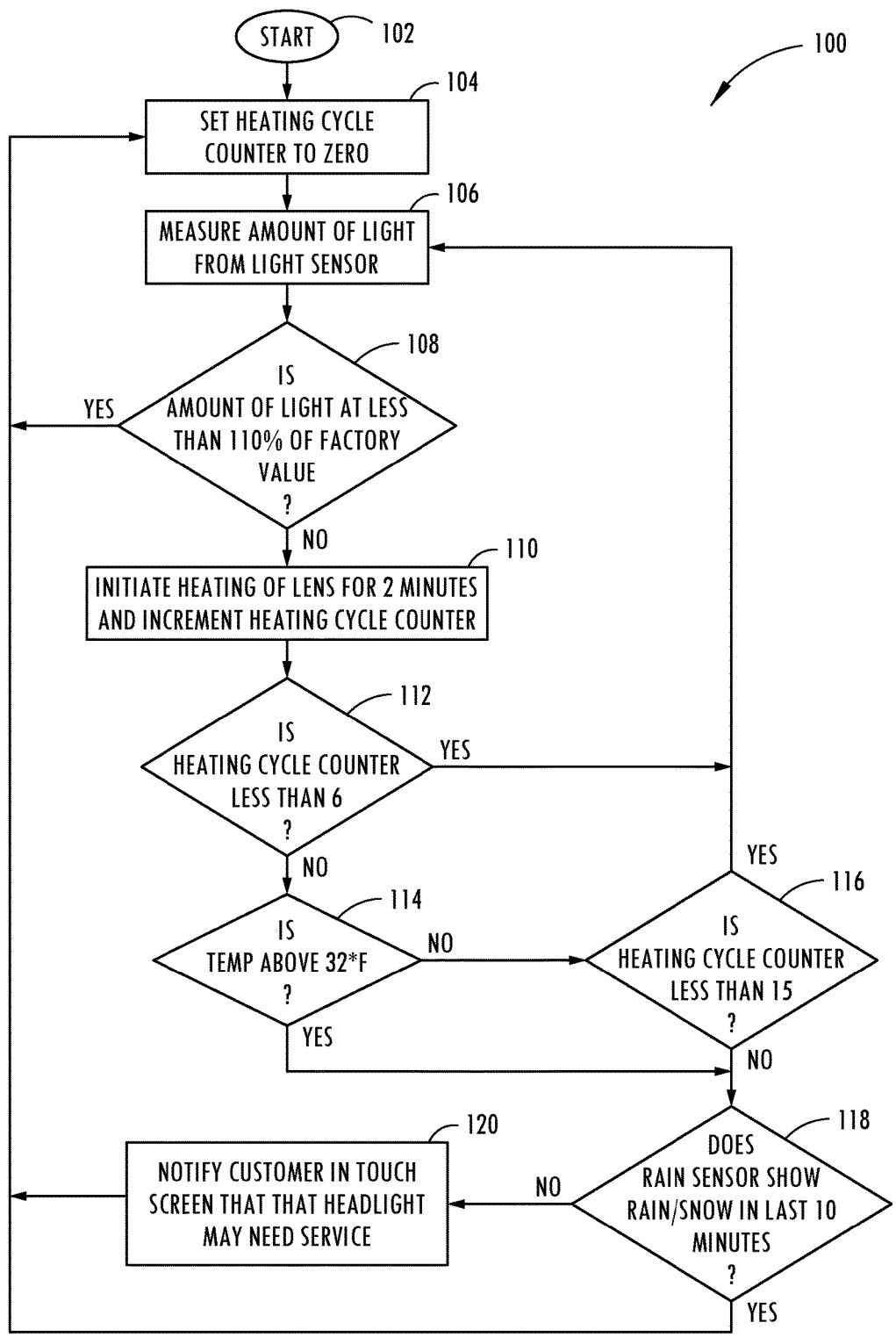
FIG. 6 is a flow diagram illustrating a routine for controlling the heater/defroster, according to one embodiment.

Referring to FIG. 6, routine 100 is illustrated for sensing moisture on the outer lens and activating the heater, according to one embodiment. Routine 100 begins at step 102 and proceeds to step 104 to set the heating cycle counter to zero and then to step 106 to measure the amount of light sensed with the light sensor. At decision step 108, routine 100 determines if the amount of sensed light is less than 110% of a factory set value and, if not, returns to step 104. When the sensed light is less than 110% of the factory set value, the moisture on the outer lens is assumed to be low or non-existent such that no heating of the lens is needed. It should be appreciated that the factory value may be dependent upon daylight and nighttime ambient lighting conditions, such that a day/night sensor that senses daylight or nightlight conditions may determine if it is daytime or nighttime and may select the corresponding factory set value for daytime or nighttime.

If the amount of sensed reflected light is equal to or greater than 110% of the factory set value, it is assumed that moisture is sensed on the lens and routine 100 proceeds to step 110 to initiate heating of the outer lens with activation of the heater for a fixed time period, such as two minutes, and increments the heating cycle counter. Next, at decision step 112, routine 100 determines if the heating cycle counter is less than a preset first count value of 6, for example, and, if so, returns to step 106. If the heating cycle counter is at the preset value of 6 or greater, routine 100 proceeds to decision step 114 to determine if the ambient temperature is above 32° F., which is the freezing point of water at one atmospheric pressure. If the temperature is not above the freezing point of 32° F., routine 100 proceeds to decision step 116 to determine if the heating cycle counter is less than a higher second count value of 15, for example, and, if so, returns to step 106. If the temperature is above 32° F. or if the heating cycle counter is not less than a count value of 15, routine 100 proceeds to decision step 118 to determine if the rain sensor senses rain or snow in the last ten minutes and, if so, returns to step 104. If the rain sensor does not sense rain or snow in the last ten minutes, routine 100 proceeds to step 120 to notify the customer on a touchscreen or other human machine interface or output that the headlight may need service, which may be indicative of a scratched lens or other problem that is not necessarily solved by heating the lens 24 with the heater.

Accordingly, the vehicle light assembly 20 advantageously employs a light sensor within the housing of the assembly for sensing light reflected rearward due to moisture on the lens to detect the amount of moisture on the lens and controls a heater for heating the lens to remove the moisture. The vehicle light assembly advantageously maintains a low moisture level and minimizes efforts of a driver to maintain a moisture-free lens.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle light assembly comprising:
   a housing;
   a light source disposed in the housing;
   a lens disposed in front of the light source;
   a sensor disposed in the housing for sensing light emitted by the light source and reflected from moisture on the lens;
   a heater disposed on the lens and activated based on the sensed light for reducing the moisture;
   a light shield located between the light source and the sensor to block light emitted directly from the light source;
   a rain sensor detecting outside moisture; and
   a controller controlling the heater and communicating with the rain sensor, the light sensor and the heater, wherein the controlling activates the heater based on the sensed reflected light and outputs a notice to service the light assembly when the rain sensor detects no outside moisture for a predetermined time while the sensed reflected light indicates moisture inside the lens.

2. The vehicle light assembly of claim 1 further comprising a controller for controlling the heater to heat the lens when moisture is detected with the sensor.

3. The vehicle light assembly of claim 1, wherein the heater comprises an electric heater having a conductive circuit formed on the lens.

4. The vehicle light assembly of claim 1, wherein the conductive circuit comprises a visually transparent conductive material.

5. The vehicle light assembly of claim 1, wherein the sensor comprises a light sensor.

6. The vehicle light assembly of claim 1, wherein the light source directs light output within a beam towards the lens and the sensor is disposed within the housing outside of the beam.

7. The vehicle light assembly of claim 1, wherein the light assembly comprises a vehicle headlight on the front of the vehicle.

8. The vehicle light assembly of claim 1, wherein the light assembly comprises a vehicle taillight on the rear of the vehicle.

9. A vehicle light assembly comprising:
   a housing;
   a light source disposed in the housing;
   a lens disposed in front of the light source;
   a light sensor disposed in the housing outside of a beam of light output directed from the light source towards the lens for sensing light from the light output reflected from moisture on the lens;
   a heater disposed on the lens for reducing the moisture; and
   a light shield located between the light source and the sensor to block light emitted directly from the light source;
   a rain sensor detecting outside moisture; and
   a controller controlling the heater and communicating with the rain sensor, the light sensor and the heater, wherein the controlling activates the heater based on the sensed reflected light and outputs a notice to service the light assembly when the rain sensor detects no outside moisture for a predetermined time while the sensed reflected light indicates moisture inside the lens.

10. The vehicle light assembly of claim 9 further comprising a controller for controlling the heater to heat the lens when moisture is detected with the sensor.

11. The vehicle light assembly of claim 9, wherein the heater comprises an electric heater having a conductive circuit formed on the lens.

12. The vehicle light assembly of claim 11, wherein the conductive circuit comprises a visually transparent conductive material.

13. The vehicle light assembly of claim 9, wherein the light assembly comprises a vehicle headlight on the front of the vehicle.

14. The vehicle light assembly of claim 9, wherein the light assembly comprises a vehicle taillight on the rear of the vehicle.

15. A vehicle headlight assembly comprising:
a housing;
a light source disposed in the housing;
a lens disposed in front of the light source, wherein the light source directs light output in a beam towards the lens;
a light sensor disposed in the housing outside of the beam of light output from the light source directed at the lens for sensing light from the light output reflected from moisture on the lens;
a heater disposed on the lens for reducing the moisture;
a light shield located between the light source and the sensor to block light emitted directly from the light source;
a rain sensor detecting outside moisture; and
a controller controlling the heater and communicating with the rain sensor, the light sensor and the heater, wherein the controlling activates the heater based on the sensed reflected light and outputs a notice to service the light assembly when the rain sensor detects no outside moisture for a predetermined time while the sensed reflected light indicates moisture inside the lens.

16. The vehicle light assembly of claim 15 further comprising a controller for controlling the heater to heat the lens when moisture is detected with the sensor.

17. The vehicle light assembly of claim 15, wherein the heater comprises an electric heater having a conductive circuit formed on the lens.

* * * * *